United States Patent [19]
Stewart

[11] Patent Number: 5,673,925
[45] Date of Patent: Oct. 7, 1997

[54] QUICK RELEASE SKEWER SYSTEM

[76] Inventor: Christopher R. Stewart, 496 Rincon Rd., El Sobrante, Calif. 94803

[21] Appl. No.: 581,701

[22] Filed: Dec. 29, 1995

Related U.S. Application Data

[63] Continuation of Ser. No. 185,664, Jan. 21, 1994, abandoned.
[51] Int. Cl.[6] .................................................. B60B 35/00
[52] U.S. Cl. ...................... 280/279; 301/111; 301/124.2; 411/432
[58] Field of Search ........................... 280/279; 411/132, 411/134, 144, 146, 948, 945, 954, 347, 349, 550, 552, 384, 432, 427, 435, 136, 140, 996; 301/124.2, 128, 131, 132, 111, 122.5, 121

[56] References Cited

U.S. PATENT DOCUMENTS

| D. 255,772 | 7/1980 | Johnson et al. | 411/349 |
|---|---|---|---|
| 4,374,453 | 2/1983 | Rodriguez | 411/435 |
| 4,763,957 | 8/1988 | Poehlmann | 301/111 |
| 4,938,644 | 7/1990 | Runels | 411/143 |
| 5,044,854 | 9/1991 | Oh | 411/342 |
| 5,090,855 | 2/1992 | Terry | 411/134 |
| 5,314,279 | 5/1994 | Ewing | 411/134 |

Primary Examiner—Anne Marie Boehler
Attorney, Agent, or Firm—Townsend and Townsend and Crew LLP

[57] ABSTRACT

An improved quick release skewer system consisting of a connecting rod with a cam-actuated cap on one end and an expandable retaining nut on the other end. The device is specifically designed for application in mounting quick-release-skewer-hub bicycle wheels on bicycle forks having safety flanges which are intended to prevent the wheel from falling off the fork if the cam-actuated cap is accidentally loosened. Prior to the invention, to remove the wheel from the fork, the retaining nut had to be unscrewed. With the invention, once the cam-actuated cap is loosened, the expandable retaining nut is collapsed to further loosen compression forces on the bicycle fork and permit the wheel to be removed from the fork without unscrewing the nut. The expandable retaining nut prevents mishap in the event the operator fails to screw the nut back to its original position. The expandable retaining nut consists of a T-nut having a pair of arms projecting axially from a cylindrical body and a collar rotatably surrounding the cylindrical body with first and second landings for the arms at different levels from one another so that when the T-nut arms rest on one pair of landings, the nut is expanded and when they rest on another landing the nut is contracted.

11 Claims, 2 Drawing Sheets

QUICK RELEASE SKEWER SYSTEM

This is a continuation of application Ser. No. 08/185,664, filed Jan. 21, 1994, now abandoned.

BACKGROUND OF THE INVENTION

Bicycle wheels and other devices are often mounted with a quick release skewer, sometimes also referred to as a quick release clamping assembly.

In the bicycle wheel example, the quick release skewer is essentially a tie rod at the center of the bicycle wheel hub, with a lever actuated cam at one end of the rod and a retaining nut at the other. When the wheel is mounted on the fork of a bicycle frame, the cam lever is pivoted to its clamping position, narrowing the gap between cam and retaining nut to clamp the fork, thereby holding the wheel securely in place on the fork. By pivoting the cam lever to its open position, the gap between the cam and the nut is enlarged, thereby releasing clamping pressure on the fork and allowing the wheel to drop out of the fork, e.g. for replacement or repair. Unfortunately, cam levers sometimes accidently flip open while the bicycle is being ridden, allowing the wheel to drop out of the fork accidentally, causing mishaps and injuries.

Various approaches for eliminating this hazard have been adopted by manufacturers. One approach is the addition of a safety lip or flange at the bottom edge of the bicycle frame fork "dropout" (the slotted portion at the end of the fork that actually receives the wheel axle) so that when the quick release cam lever is flipped to the open position, the gap between cam lever and retaining nut is not quite wide enough to clear the lip/flange, so the wheel will not drop out of the fork without also loosening the retaining nut.

Another closely related approach is to provide a depression or seat for the retaining nut in the bicycle fork dropout. Here again, the mere act of opening the cam lever does not expand the cam/nut gap quite enough for the retaining nut to clear the seat. Thus, to actually remove the wheel from the dropout, not only must the cam lever be opened, but the retaining nut must also be loosened.

Because these safety features require the added step of loosening the retaining nut, they make wheel release more inconvenient. Moreover, when the wheel is re-mounted to the bicycle fork, the retaining nut must be re-tightened with some precision, lest the safety feature be defeated and/or the wheel be improperly re-mounted on the fork.

A similar problem exists in mounting such bicycles to cartop bicycle racks and wind trainers. Certain racks/trainers include a quick release skewer for fastening the bike to the rack/trainer. In operation, after removing the bicycle wheel, the rider fits the frame fork onto the rack/trainer's quick release skewer and closes the cam lever to attach the bicycle securely on the rack/trainer. Just as the safety lip/seat safety devices will not allow the bicycle wheel to be removed and properly remounted without also adjusting the nut, these safety devices will not allow the bike to be mounted and removed from the rack/trainer without also adjusting the retaining nut.

SUMMARY OF THE INVENTION

The present invention is directed to an improved quick release skewer system for mounting bicycle wheels, car racks, wind trainers and the like to bicycle frame forks.

In the quick release skewer system of the present invention the conventional retaining nut is replaced with an expandable retaining nut. The expandable retaining nut consists primarily of two pieces: a T-nut and a collar. The barrel of the T-nut is rotatably seated in the collar. The collar includes a pair of 90 degree opposed transverse notches, one deep and one shallow. The arms of the T-nut typically locate in one notch or the other, at which time the collar is locked against rotation. When the wheel is properly secured on the fork in a condition for the bicycle to be ridden, the T-nut arms locate in the shallow notch, so that the retaining nut dimension is large and the gap between cam and retaining nut is thereby minimized.

To remove the wheel from the fork, the operator first flips open the cam lever, expanding the gap between the cam and retaining nut. Next, the operator slides the collar axially along the skewer rod toward the cam, away from the T-nut, until the T-nut arms are clear of the shallow collar notch. The operator then rotates the collar one quarter turn and slides the collar back in the opposite axial direction, away from the cam, so that the T-nut arms slide into the deeper collar notch. This reduces the axial dimension of the nut which, in turn, enlarges the gap between cam and retaining nut, and provides the added clearance necessary to slide the wheel out of the fork past the safety lip.

To replace the wheel on the fork, the operation is reversed. The original cam/retaining nut gap is restored with precision by simply restoring the collar to its original position, with the T-nut arms located in the shallow collar notch, and closing the cam lever.

Preferably, the internal threaded channel of the T-nut is fitted with a nylon insert designed to tightly grip the skewer and prevent the T-nut from accidentally unscrewing when the retaining nut is being expanded or contracted.

Preferably, the collar is further provided with an external sleeve and dust cap, to prevent dirt from entering into the notches, which could interfere with proper operation of the expandable retaining nut.

Other features and advantages of the invention will appear from the following description in which the preferred embodiments have been set forth in detail in conjunction with the accompanying drawings.

DESCRIPTION OF THE PREFERRED EMBODIMENT

Figure 1:
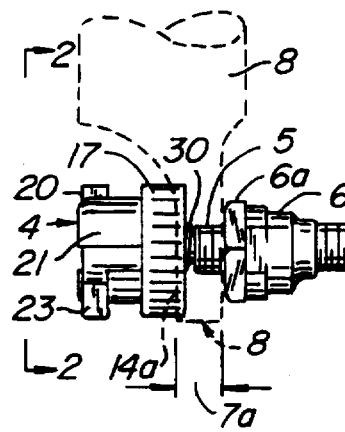
FIG. 1 is a frontal elevation, with parts broken away and shown in phantom, of a bicycle wheel axle embodying the improved quick release skewer system of the present invention.

FIG. 1 illustrates a bicycle axle/quick release skewer system 1 consisting of a central connecting rod 2, a lever actuated cam assembly 3 at one end of the connecting rod, and an expandable retaining nut 4 at the opposite end of the rod 2. The mid-section of retaining rod 2 is encased in a hollow center tubular shaft 5, which includes lock nuts 6a and cone nuts 6b at either end. The tubular shaft 5 is shorter than the connecting rod 2, so that both ends of the connecting rod 2 protrude from the ends of the tubular shaft 5.

One end of the protruding connecting rod 2 is threaded for adjustable screw engagement with the expandable retaining nut 4. The other protruding end of the connecting rod 2 is integrally formed with the lever actuated cam assembly 3.

The lever actuated cam assembly 3 is of conventional design, comprised of an enlarged cylindrical cap 9 with a transverse aperture 10 housing a cam shaft 11 connected at right angle to a cam lever arm 12. That part of the cam shaft 11 located within the transverse aperture 10 is eccentric relative to the pivotal axis of the aperture 10, so that when the lever arm 12 is pivoted back and forth between positions 12a and 12b, the cap 9 reciprocates axially back and forth between positions 13a and 13b, respectively. The cam assembly is provided with an enlarged presser seat 16 at its base.

The tubular shaft 5, including lock nuts 6 and cone nuts 7, is shorter than the distance between the cam assembly 3 and expandable retaining nut 4, so that there are gaps 7a and 7b between the left lock nut 6a and retaining nut 4, and between the right lock nut 6a and cam assembly 3, respectively. The gaps 7a and 7b are designed to receive a pair of bicycle fork ends 8. Each fork end 8 is slotted to receive the tubular shaft 5. Slotted bicycle fork ends 8 are sometimes also referred to as "dropouts".

As would be readily understood by persons of ordinary skill in the art, the tubular shaft 5 is designed to carry a bicycle wheel (not shown), with the hub of the wheel rotatably, coaxially surrounding that portion of the tubular shaft 5 in the space between the right and left cone nuts 6b. The ball race of each wheel bearing (also not shown) rides in the concave curvature of each cone nut 6b. In operation, the bicycle wheel hub rotates relative to the shaft 5 about their common axis.

In such application, the quick release skewer assembly 1 (as well as the bicycle wheel) is removed from the bicycle fork by pivoting the cam lever handle to position 12b, causing the cap 9 to move to position 13b. This in turn enlarges the gaps 7a and 7b, releasing clamping pressure on the dropouts 8. In this respect, note that the connecting rod 2 is free to slide axially within the tubular shaft 5, so that when gap 7b between the cam assembly 3 and spacer nuts 6b is enlarged, the tubular shaft 5 is permitted to slide toward the cam assembly 3 and enlarge the gap 7a between the expandable retaining nut 4 and lock nut 6a. Normally, once the gaps 7a and 7b are enlarged enough to relieve friction force between the lock nut 6a and retaining nut 4, on the one hand, and between the cam assembly 3 and lock nuts 6a, on the other hand, this permits the bicycle wheel to slide out of the fork dropout 8.

Figure 2:
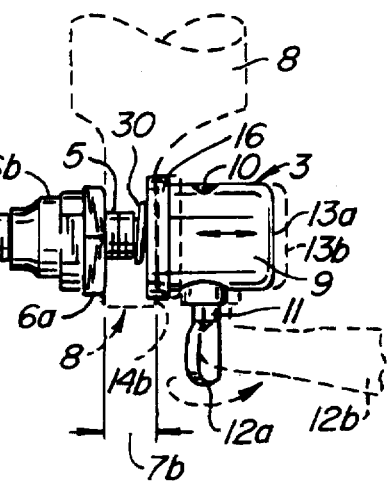
FIG. 2 is a side elevation of the system of FIG. 1 taken along lines 2—2.
Figure 2:
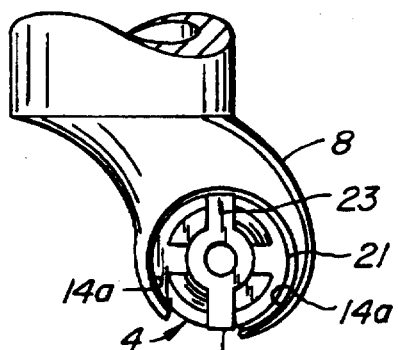

For safety, to prevent bicycle wheels from accidentally sliding out of the dropout 8 if the cam lever opens unexpectedly, some bicycle manufacturers have provided the dropouts 8 with anti-dropout safety devices. One such device is illustrated in FIGS. 1 and 2 wherein the dropout 8 is provided with an axially extending safety rim 14a which partially encircles the retaining nut 4. The retaining nut 4 has an enlarged presser base 17. As long as the presser base 17 of nut 4 is seated in the depression formed by the safety rim 14a, the quick release skewer 1 will not slip out of the dropout slot unless the gap 7a is enlarged enough to clear the safety rim 14a. Since corresponding safety rims 14a and 14b are formed on each dropout 8, the same is true of the cam assembly 3 i.e as long as the presser base 16 of the cam assembly 3 is seated in the depression formed by the safety rim 14b, the axle/quick release skewer 1 will not slip out of the dropout slot unless the gap 7b is enlarged enough to clear the safety rim 14b. In bicycles formed with anti-dropout safety devices of the type shown in FIGS. 1 and 2, the dimensions of the system are intentionally selected so that when the cam assembly lever 12 is pivoted to open position 12b, gaps 7a and 7b are not enlarged enough to clear the safety rims 14a and 14b. Thus, the axle/quick release skewer 1 will not drop out of the dropouts 8 unless the retaining nut 4 is also loosened, further enlarging gaps 7a and 7b to the point where the retaining nut 4 and cam assembly 3 can clear the safety rims.

Figure 3:
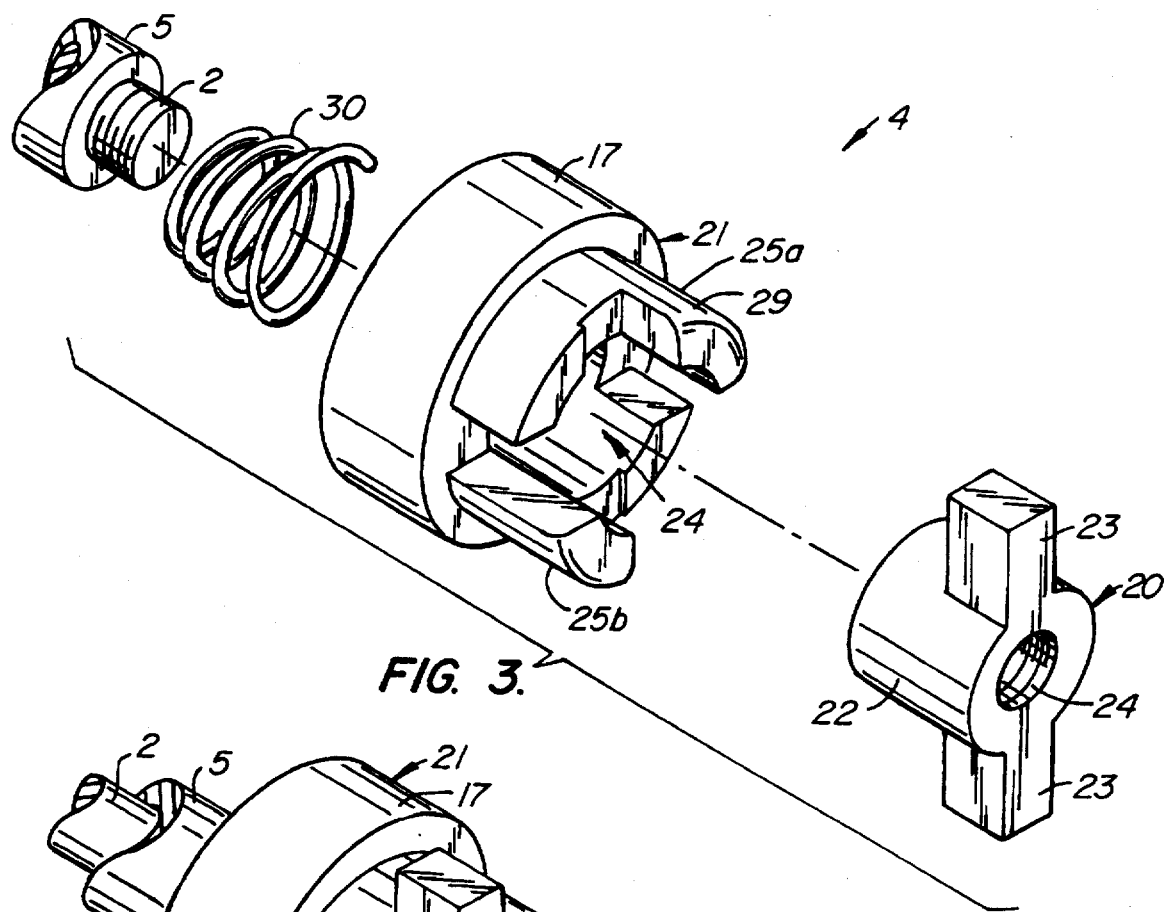
FIG. 3 is an enlarged exploded view of the expandable retaining nut 4 shown in FIGS. 1 and 2.
Figure 4:
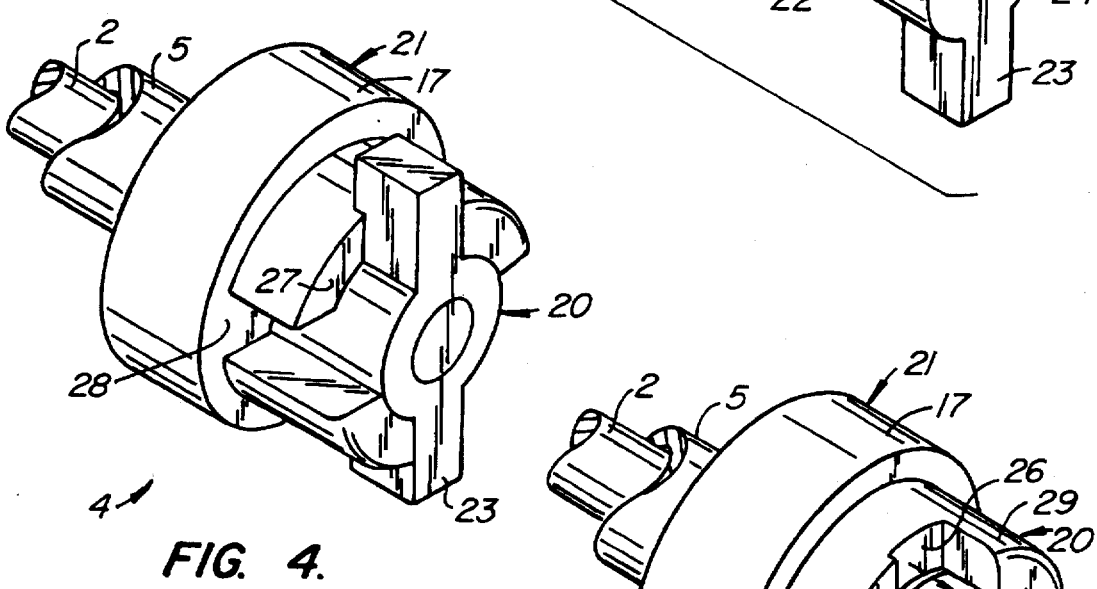
FIG. 4 is an enlarged view of the expandable retaining nut 4, from FIGS. 1-3, shown in its expanded configuration.
Figure 5:
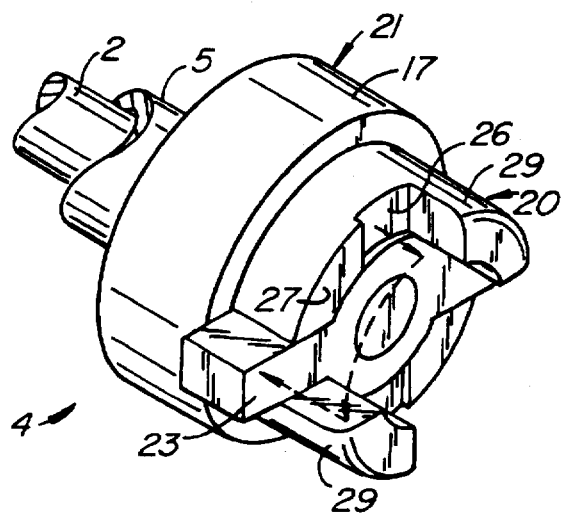
FIG. 5 is the expandable retaining nut of FIG. 4 shown in its contracted position.

As best illustrated in FIGS. 3–5, the retaining nut 4 is expandable in the axial direction. As illustrated in FIG. 3, the expandable retaining nut 4 of the present invention includes a T-nut member 20 and an annular collar member 21. The T-nut member 20 is comprised of a cylindrical body portion 22 and opposed radially extending arms 23. The cylindrical body portion 22 includes an internal threaded channel 24 designed to threadably receive the protruding threaded end of the connecting rod 2. Preferably, the internal threaded channel 24 is fitted with a rotation resistant device, such as a nylon insert of the type sold under the trademark "Nylock" (not shown). With such rotation resistant devices, while the T-nut can be screwed on and off the threaded connecting rod 2, the Nylock insert prevents accidental rotation of the T-nut, such as is sometimes caused during the expansion or contraction of the retaining nut 4.

The annular collar member 21 has an enlarged cylindrical presser base 17, and a central axial cylindrical channel 24 for slidably, rotationally receiving the cylindrical body portion of the T-nut 20. The collar member 21 is further provided with an identical pair of opposed, concentric raceway-defining portions 25a and 25b ("race portions") integrally formed in the collar 21. Since the Nylock insert of the T-nut is designed to secure the T-nut essentially stationary against rotation on the connecting rod 2, the race portions 25 and arms 23 guide axial and rotational movement of the annular collar 21 relative to the combined T-nut 20 and connecting rod 2.

The race portions 25 each have three radial surfaces or landings 26, 27 and 28 and an elongate boundary portion 29. The boundary portions 29 protrude axially the furthest distance from the enlarged presser base 17. Each boundary portion 29 is situated 180 degrees opposite from the other. The boundary portions 29 prevent the arms 23 of the T-nut from travelling through the two quadrants occupied by the boundary portions 29, so that radial movement of the T-nut is limited to the two unoccupied quadrants. This, in turn, limits the T-nut to a ninety degree radial range of movement. Landing 28 is the deepest of all three landings, formed on the axially outermost surface of presser base 17. Landing 27 is the shallowest of all three landings, formed approximately ⅜ inch higher than landing 28. Landing 26 is approximately 1/32 inch lower than landing 27.

In operation, when the T-nut 20 is rotated in the annular collar 21, the arms 23 of the T-nut 20 interact with the race portions 25 of the collar 21 to control the radial and axial movement or the collar 21 relative to the T-nut 20. For example, starting with the retaining nut 4 in its so-called "expanded" configuration, as shown in FIG. 4, the T-nut arms locate on the lands. Because the lands 26 are deeper than the adjoining lands 27 and the boundary portion 29, the arms 23 are held securely against radial movement. Compression spring 30 encircles connecting rod 2 and urges annular collar member 21 axially against T-nut 20, to prevent the arms 23 from slipping by accident.

In the expanded configuration shown in FIG. 4, the retaining nut 4 has a relatively large axial dimension overall. To convert the retaining nut 4 to its contracted configuration, as shown in FIG. 5, the annular collar 21 is manually drawn axially away from the T-nut 20, against the urging of the spring 30, to permit the arms 23 of the T-nut 20 to clear the surface of the adjacent relatively high lands 27. The operator then rotates the collar 21 clockwise one quarter turn so that the arms 23 rotate through the sectors occupied by the lands 27 into the sectors occupied by the deepest lands 28. Once the arms reach the sectors occupied by the deep lands 28, the operator releases the annular collar 21 permitting the spring 30 to urge the arms 23 of the T-nut 20 to slide into contact with the deep lands 28, as shown in FIG. 5. In the configuration shown in FIG. 5, the expandable retaining nut 4 is in its contracted configuration.

With the cam assembly 3 in its open position 13b and the retaining nut 4 in the contracted configuration shown in FIG. 5, the gaps 7a and 7b are large enough to clear safety lips 14a and 14b so that the axle/quick release skewer assembly 1 can be removed from the bicycle fork dropouts 8 without disturbing the screw setting of the T-nut 20 on the connecting rod 2.

To return quick release skewer 1 to the bicycle fork dropouts 8, the foregoing steps are reversed. First, the operator reinstalls the axle/skewer 1 on the dropouts 8. To do this, the operator slides the axle/skewer 1 into the slots of the dropouts so that the gaps 7a and 7b rest in the dropout slots. Next, the retaining nut 4 must be restored to its expanded configuration shown in FIG. 4. To do this, the operator manually pulls the annular collar 21 axially away from the T-nut 20, against the urging of the compression spring 30, by a distance sufficient for the arms 23 to clear the lands 27. The operator then rotates the annular collar 21 counterclockwise one quarter turn, until the arms 23 register with the shallow lands 26. The operator then releases the collar 21, whereupon the compression spring 30 urges the arms 23 into seating engagement with the shallow lands 26. This restores the retaining nut 4 to its expanded configuration as shown in FIG. 4. Finally, the axle/skewer 1 must be clamped tightly and securely on the bicycle fork dropouts 8. To do this, the operator simply pivots the cam lever 12 from position 12b to 12a, which returns the cap 9 from position 13b to 13a. With the cam assembly 3 in this position, the gaps 7a and 7b are returned to their original widths, causing the bicycle fork dropouts 8 to be tightly clamped between the retaining nut 4 and spacer nuts 6a, on the one hand, and between the cam assembly 3 and spacer nut 6a on the other hand.

It will be appreciated that the foregoing removal and replacement of the axle/skewer 1 from the dropouts 8 has been accomplished without disturbing the screw setting of the T-nut 20 on the connector rod 2. Thus, the original clamping pressure between axle/skewer 1 and dropout 8 will be restored despite removal and replacement of the skewer.

Figure 6:
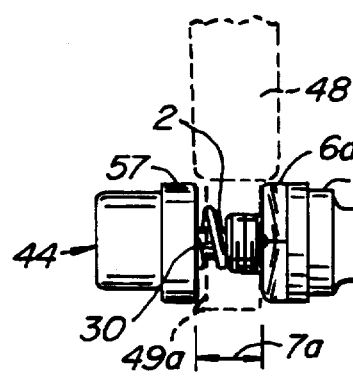
FIG. 6 is a frontal elevation, with parts shown in phantom, of an alternate embodiment of the improved quick release skewer system for bicycle forks.

FIG. 6 illustrates a modified quick release skewer system 41 according to the present invention. The modified system includes the same cam assembly 3, with cap 9 and cam lever 12; the same connecting rod 2 and compression springs 30; and the same tubular shaft 5 enclosing the mid section of the connecting rod 2; and the same lock nuts 6a and cone nuts 6b, as shown in the system of FIGS. 1–5. The differences are in the expandable retaining nut 44 mounted on the opposite end of the connecting rod 2 from the cam assembly 3. In addition, FIGS. 6 and 6A illustrate the skewer system of the present invention in conjunction with a different style safety bicycle fork dropout 48.

Figure 6A:
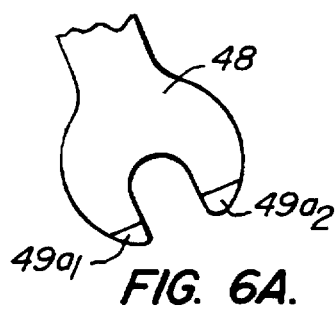
FIG. 6A is a side elevation of a portion of the bicycle fork 48 shown in FIG. 6.

The modified dropout 48 of FIGS. 6 and 6A is essentially the same as the dropout 8 shown in FIGS. 1–5, except that, rather than circular rims 14a,b partially surrounding the presser portions 17 and 16 of the retaining nut 4 and cam assembly 3, respectively, the circular rims 14a,b are replaced with a pair of lips or flanges 49a,b projecting axially from the ends of the dropouts 48, one of each such flanges (e.g. $49a_1$ and $49a_2$) being located on either side of the dropout slot, as shown in FIG. 6A. This modified safety dropout 48 serves the same purpose as safety dropout 8—to prevent the axle/quick release skewer 1, 41 from dropping out of the bicycle fork dropout 8, 48 if the cam lever 12 is opened accidentally. As with the safety rim 14, the safety flange 49 interferes with removal of the skewer 41 unless the gaps 7a and 7b are enlarged more than can be accomplished by merely releasing the cam lever 12. The safety dropout of FIGS. 6 and 6A will operate the same with the skewer system of FIGS. 1–5, as with the modified skewer system of FIGS. 6–8.

Figure 7:
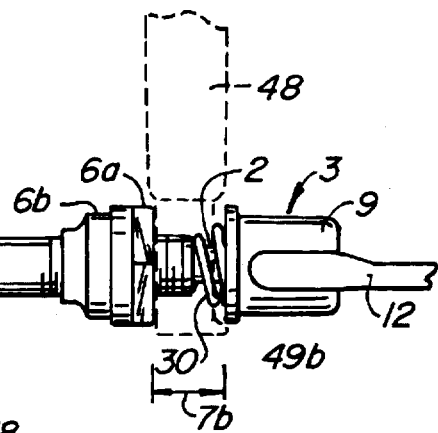
FIG. 7 is and enlarged view, with parts broken away and shown in section, of the expandable retaining nut 44 shown in FIG. 6.
Figure 7:
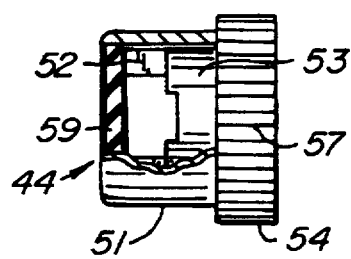
Figure 8:
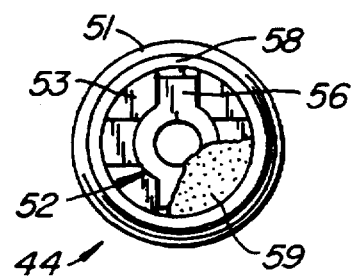
FIG. 8 is an enlarged side elevation, with parts broken away, of the expandable retaining nut shown in FIG. 6.

The modified retaining nut 44 of FIGS. 6–8 is essentially the same as the retaining nut 4 shown in FIGS. 1–5, except that a tubular outer sleeve 51 encloses the T-nut 52 and the race portions 53 of the annular collar 54. This sleeve 51 is fixedly attached to or integrally formed with the annular collar member 54, and its inner diameter is wide enough to permit the arms 56 of the T-nut to rotate freely throughout the desired range of rotation. The outer end of the tubular outer sleeve 51 serves as a seat for a disk-shaped cap 59. The tubular outer sleeve 51 and cap 59 cooperate to keep dirt and other unwanted materials from entering the working region of the nut 44. They also guard the sharp outer edges of the T-nut 52 and prevent the T-nut from accidentally falling out when the unit 44 is removed from rod 2.

Figure 9:
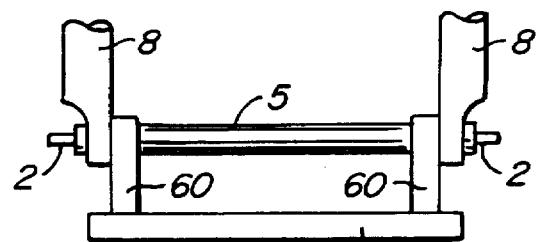
FIG. 9 is an alternate application for the improved quick release skewer system for bicycle forks, showing the connecting rod 2 and tubular shaft 5 of the system installed on a mounting bracket for automobile roof racks and/or wind trainers.

While the details of the present invention have been described above in connection with its application to the removal and replacement of a bicycle wheel from and to a bicycle frame, there are other applications. For example, as shown in FIG. 9, the quick release skewer system of the present invention is suitable for use in connection with automobile racks for carrying bicycles. Specifically, as shown in FIG. 9, the connecting rod 2 and tubular shaft 5 are fixedly mounted on a pair of arms 60 extending vertically upward from a base 61. The base 61 is mounted on a car rack, wind trainer or other structure upon which the bicycle (sans wheel) is to be attached. As shown, the bicycle fork dropout 8 slides down over the tubular shaft 5. A cam assembly (as shown at 3 in FIGS. 1, 6) is mounted (not shown here) on one end of the connecting rod 2, and an expandable retaining nut (as shown at 4 in FIGS. 1–5, or as at 44 in FIGS. 6–8) is mounted on the other end of the rod 2. The structure and operation of the quick release skewer of FIG. 9 is the same as described in connection with FIGS.

1-8, except that when the cam assembly 3 is clamped down in FIG. 9, the cam assembly 3 and retaining nut 4 clamp the fork dropouts 8 between the cam 3/nut 4 and the vertical arms 60, rather than between the cam 3/nut 4 and lock nuts 6a (as in FIGS. 1-8).

Other modifications and variations can be made to the disclosed embodiments without departing from the subject of the invention as defined in the following claims.

What is claimed is:

1. A quick release skewer system comprising:
   a skewer rod having a lever actuated cam at one end and a threaded portion at the other end; and
   an expandable retaining nut threadably mounted on the threaded end of the skewer rod, said retaining nut including
      a T-nut with a cylindrical body portion and opposed arms extending perpendicular to the axis of the body portion, and
      an annular collar rotatably encircling the cylindrical base of the T-nut, said collar including first and second notches formed in one end of the collar, said notches extending perpendicular to and intersecting at the collar axis, the first notch being relatively deep compared to the second notch, so that when the collar is in a first position on the T-nut, the arms of the T-nut locate in the first notch and when the collar is in a second position on the T-nut, the arms of the T-nut locate in the second notch, whereby the longitudinal dimension of the retaining nut is greater when the collar is set in the second position than when in the first position.

2. The system of claim 1 in which the expandable nut has a outer shell enclosing the T-nut.

3. The system of claim 1 in which said skewer rod is located on a bicycle wheel axle.

4. The system of claim 1 in which the skewer rod is adapted to mount a bicycle fork dropout on a bicycle carrier rack.

5. The system of claim 1 in which the skewer rod is adapted to mount a bicycle fork dropout on a wind trainer.

6. A quick release skewer system for a bicycle wheel axle comprising:
   a skewer rod having two opposing ends with a lever actuated cam at one end and a threaded portion at the opposite end, said lever actuated cam movable between first position and a second position axially outward from the first position;
   an expandable retaining nut threadably mounted on the threaded end of the skewer rod, said retaining nut including
      a T-nut with a cylindrical body portion and opposed arms extending perpendicular to the axis of the body portion;
      an annular collar rotatably encircling the cylindrical body portion of the T-nut, said collar including first and second notches formed in one end of the collar, said notches extending perpendicular to and intersecting at the collar axis, the first notch being relatively deep compared to the second notch, so that when the collar is in a first position on the T-nut, the arms of the T-nut locate in the first notch and when the collar is in a second position on the T-nut, the arms of the T-nut locate in the second notch, whereby the longitudinal dimension of the retaining nut is greater when the collar is set in the second position than when in the first position; and
   a bicycle having a wheel fork with a dropout and a safety flange on the bottom edge of the dropout, so that when the lever actuated cam is moved to its second position, the rod will not drop out of the fork unless the expandable retaining nut is configured with its collar set in the said first position.

7. The system of claim 6 in which the expandable nut has a outer shell enclosing the T-nut.

8. The system of claim 6 in which said skewer rod is located on a bicycle wheel axle.

9. The system of claim 6 in which the skewer rod is adapted to mount the bicycle fork dropout on a bicycle carrier rack.

10. The system of claim 6 in which the skewer rod is adapted to mount the bicycle fork dropout on a wind trainer.

11. A quick release skewer system comprising:
   a skewer rod having a lever actuated cam and a threaded portion; and
   an expandable retaining nut threadably mounted on the threaded portion of the skewer rod, said retaining nut including
      a T-nut with a cylindrical body portion and opposed arms extending perpendicular to the axis of the body portion, and
      an annular collar rotatably encircling the cylindrical body portion of the T-nut, said collar including first and second notches formed in one end of the collar, said notches extending perpendicular to and intersecting at the collar axis, the first notch being relatively deep compared to the second notch, so that when the collar is in a first position on the T-nut, the arms of the T-nut locate in the first notch and when the collar is in a second position on the T-nut, the arms of the T-nut locate in the second notch, whereby the longitudinal dimension of the retaining nut is greater when the collar is set in the second position than when in the first position.

* * * * *